United States Patent [19]

Teramachi

[11] Patent Number: 4,774,442

[45] Date of Patent: Sep. 27, 1988

[54] LINEAR MOTOR-DRIVEN X–Y TABLE

[76] Inventor: Hiroshi Teramachi, 2-34-8, Higashi-Tamagawa, Setagaya-Ku, Tokyo, Japan

[21] Appl. No.: 73,321

[22] Filed: Jul. 13, 1987

Related U.S. Application Data

[63] Continuation of Ser. No. 777,094, Sep. 18, 1985, abandoned.

[30] Foreign Application Priority Data

Sep. 25, 1984 [JP] Japan .................................. 59-198617

[51] Int. Cl.[4] ............................................ H02K 41/02
[52] U.S. Cl. ...................................... 318/135; 310/13
[58] Field of Search ..................................... 310/12–14; 318/38, 37, 135

[56] References Cited

U.S. PATENT DOCUMENTS

| | | | |
|---|---|---|---|
| 3,716,731 | 2/1973 | Nilsson | 310/13 |
| 3,832,610 | 8/1974 | Shimizu | 310/13 X |
| 3,904,900 | 9/1975 | Shichida | 310/12 |

*Primary Examiner*—Mark O. Budd
*Assistant Examiner*—Judson H. Jones
*Attorney, Agent, or Firm*—Thomas M. Freiburger

[57] ABSTRACT

A linear motor-driven X–Y table includes a base and an intermediate saddle mounted on the base through linear bearings so as to be linearly reciprocatable in an X-axis direction. A table body is mounted on the intermediate saddle through linear bearings so as to be movable in a Y-axis direction perpendicular to the X-axis direction. A first linear motor is provided between the intermediate saddle and the base so as to be able to move the saddle linearly relative to the base, and a second linear motor is provided between the table body and the intermediate saddle so as to be able to move the table body linearly relative to the saddle.

7 Claims, 7 Drawing Sheets

LINEAR MOTOR-DRIVEN X-Y TABLE

This is a continuation of application Ser. No. 777,094 filed on Sept. 18, 1985 now abandoned.

BACKGROUND OF THE INVENTION

1. Field of the Invention

The present invention relates to an X-Y table employing linear motors as its drive source.

2. Description of the Prior Art

A typical conventional X-Y table has heretofore been arranged such that a table body mounted on a base through an intermediate saddle can slide in both the X-and Y-axis directions, orthogonal to each other. The feed mechanism of the X-Y table has been constituted by a combination of ball screw and nut assemblies and rotary motors such as a servomotor or stepping motor (see the specification of Japanese patent application laid open to public inspection under No. 214015/1983).

More specifically, a ball screw shaft is rotatably disposed on the upper side of the base so as to extend in an X-axis direction, and a ball nut, which is screwed onto the screw shaft, is secured to the intermediate saddle. A rotary motor is operably connected to one end of the ball screw shaft so that the intermediate saddle is fed in the X-axis direction along the ball screw shaft by the rotation of the motor. Similarly, a ball screw shaft is disposed on the upper side of the intermediate saddle so as to extend in the Y-axis direction perpendicular to the longitudinal axis of the first ball screw shaft, and a ball nut screwed onto the second ball screw shaft is secured to the lower side of the table body. A rotary motor is operably connected to one end of this ball screw shaft so that the table body is fed in the Y-axis direction relative to the intermediate saddle by the rotation of the corresponding motor.

A feed apparatus has also been known in which, when a ball screw shaft is rotated, the associated ball nut is also rotated by a rotary motor relative to the ball screw shaft, thereby allowing the table body to be selectively moved in a large-feed mode in accordance with the sum of the movements of the ball screw shaft and the ball nut or in a fine-feed mode in accordance with the difference therebetween, respectively.

In the last-mentioned conventional X-Y table, however, the feed of the table body in the X- and Y-axis directions is controlled by controlling the rotation of the respective rotary motors, and the table body, which is one of the movable members, is equipped with a motor, a ball screw shaft and the like and therefore has a relatively large inertia, so that the X-Y table has a poor response at the start and end of the feed operation, thus resulting in an unfavorably low degree of accuracy in the positioning of the table body.

The employment of ball screw and nut assemblies involves the disadvantages that a ball screw shaft may be twisted by rotational torque, and that backlash may occur between a ball screw shaft and a ball nut, resulting in a poor response. This also makes it impossible to increase the degree of positioning accuracy.

Furthermore, the above-described prior art commonly requires a relatively large space for mounting of the rotary motors and the ball screw and nut assemblies, resulting in an increase in the overall size of the X-Y table.

Similarly, the prior art arrangement, which enables the X-Y table to be selectively fed in a fine-feed mode and a large-feed mode, needs a motor for rotating each ball nut and another motor for rotating each ball screw shaft, that is, it needs two motors for each of the feed operations in the X- and Y-axis directions. In consequence, the overall weight and hence inertia of the table body increases to reduce the positioning accuracy thereof as well as enlarge the overall size of the X-Y table.

SUMMARY OF THE INVENTION

In view of the above, it is a primary object of the present invention to increase the degree of accuracy in positioning the table body by reducing the weight of movable members such as the table body and its related parts, and thereby improve the response at the start and stop of feed operations.

It is another object of the present invention to provide an X-Y table which has a reduced weight and is capable of being selectively fed in a fine-feed mode and a large-feed mode.

To these ends, the present invention provides a linear motor-driven X-Y table comprising: a base; an intermediate saddle mounted on the base through linear bearings so as to be linearly reciprocatable in the X-axis direction; a table body mounted on the intermediate saddle through linear bearings so as to be movable in a direction perpendicular to the X-axis direction; a first linear motor provided between the intermediate saddle and the base for driving the saddle linearly relative to the base; and a second linear motor provided between the table body and the intermediate saddle for driving the table body linearly relative to the saddle.

These and other objects, features, and advantages of the present invention will become apparent from the following description of the preferred embodiment thereof, taken in conjunction with the accompanying drawings.

DESCRIPTION OF THE PREFERRED EMBODIMENT

The present invention is described hereinunder by way of one embodiment thereof, with reference to the accompanying drawings.

Referring first to FIGS. 1 to 6, which show a linear motor-driven X-Y table in accordance with one embodiment of the present invention, a table body 3 is mounted on a base 1 through an intermediate saddle 2.

Figure 1:
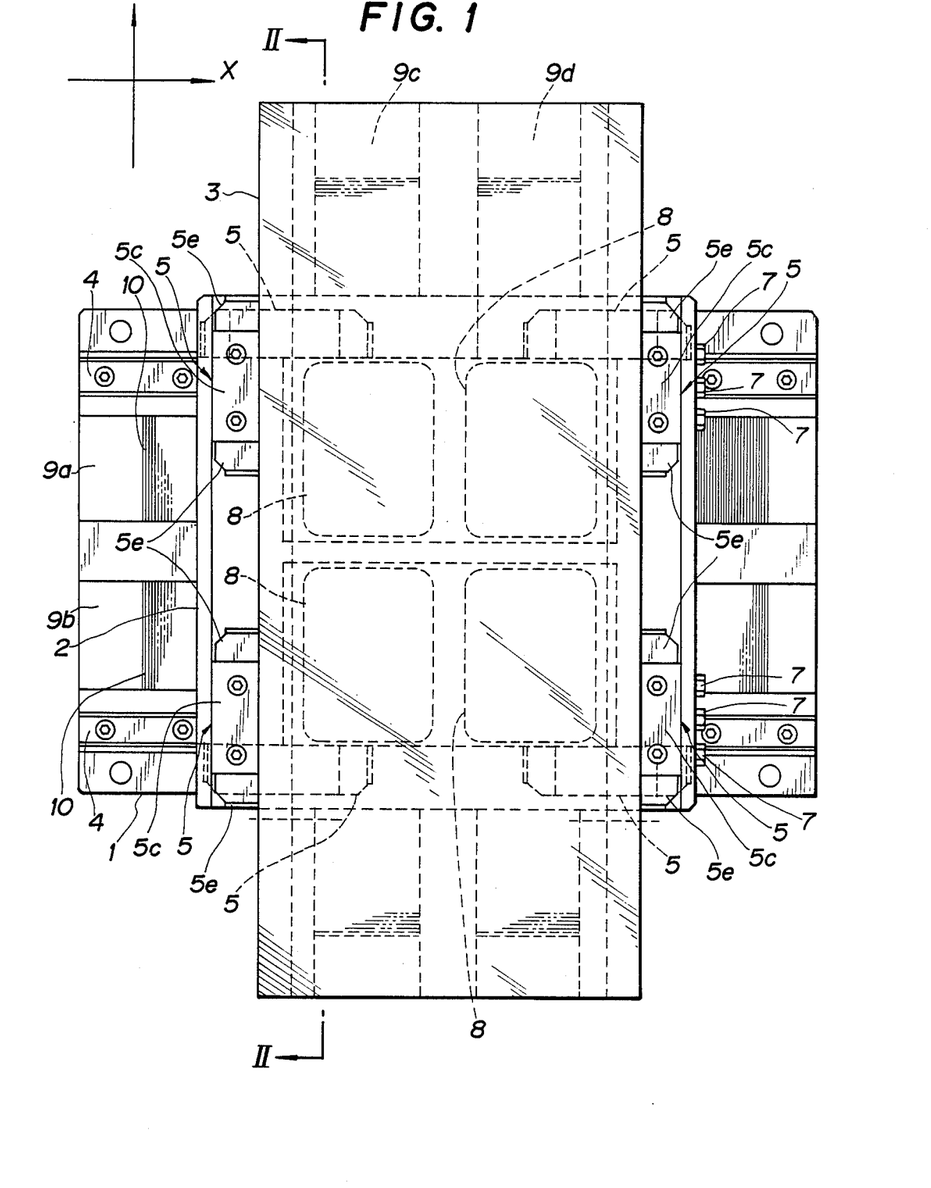
FIG. 1 is a plan view of a linear motor-driven X-Y table in accordance with one embodiment of the present invention.
Figure 2:
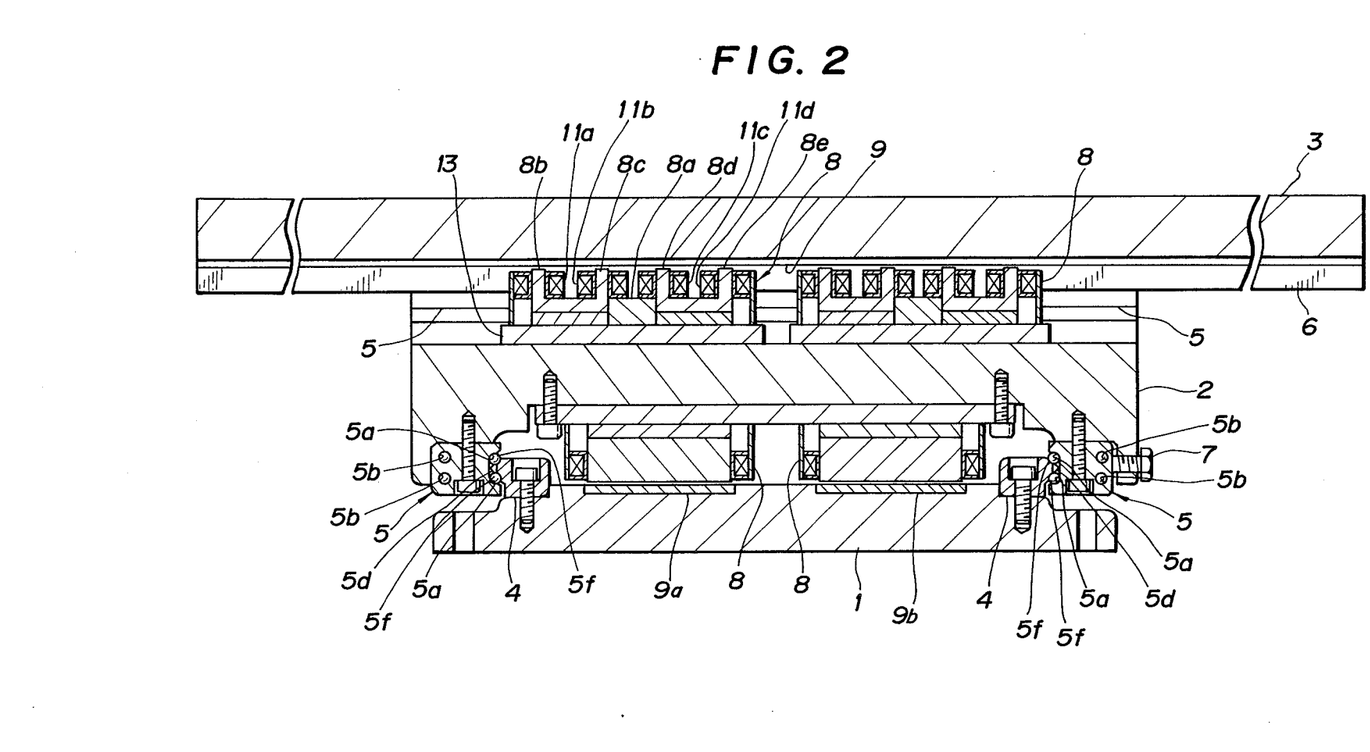
FIG. 2 is a section taken along the line II—II of FIG. 1.

Assuming that the longitudinal direction of the base 1 represents the X-axis and the direction which is parallel to the upper surface of the base 1 and perpendicular to the X-axis represents the Y-axis, a pair of parallel track rails 4 are disposed on the upper surface of the base 1 so as to extend in the X-axis direction. These track rails 4 are clamped by four linear bearings 5 which are mounted on the lower surface of the intermediate saddle 2, so that the saddle 2 can move in the axial direction of the track rails 4. Also mounted on the upper surface of the intermediate saddle 2 are another set of four linear bearings 5 which clamp track rails 6 disposed on the lower surface of the table body 3 along the Y-axis direction, so that the table body 3 can move in the Y-axis direction relative to the base 1.

Figure 3A:
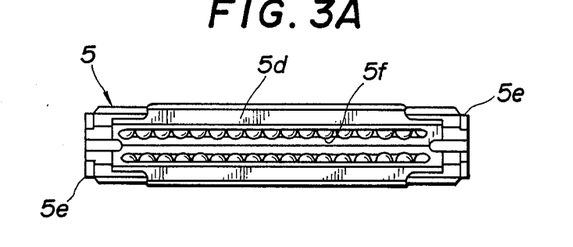
FIGS. 3A and 3B are a front elevation and a plan view, respectively, of one linear bearing employed in the apparatus shown in FIG. 1.
Figure 3B:
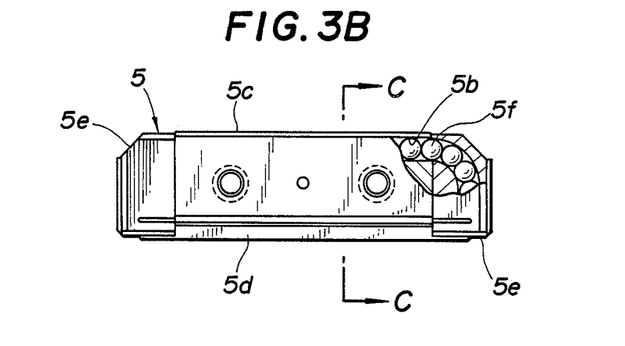
Figure 3C:
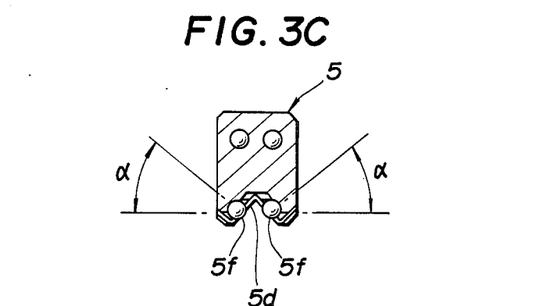
FIG. 3C is a section taken along the line C—C of FIG. 3B.
Figure 4A:
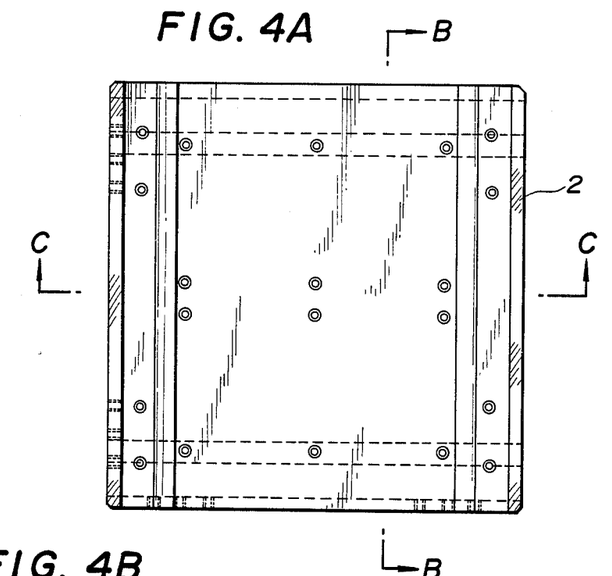
FIG. 4A is a plan view of the intermediate saddle of the apparatus shown in FIG. 1.
Figure 4B:
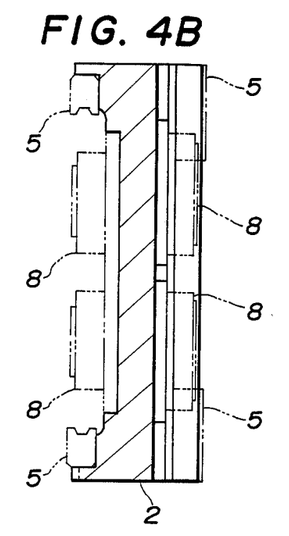
FIGS. 4B and 4C are sections taken along the lines B—B and C—C of FIG. 4A, respectively.
Figure 4C:
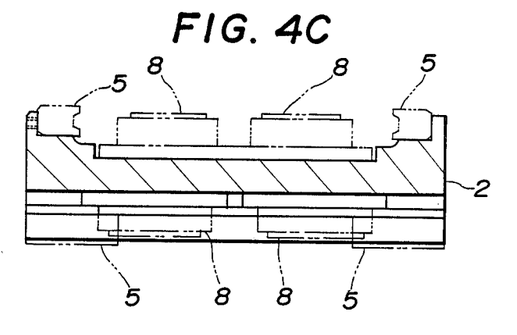
Figure 5A:
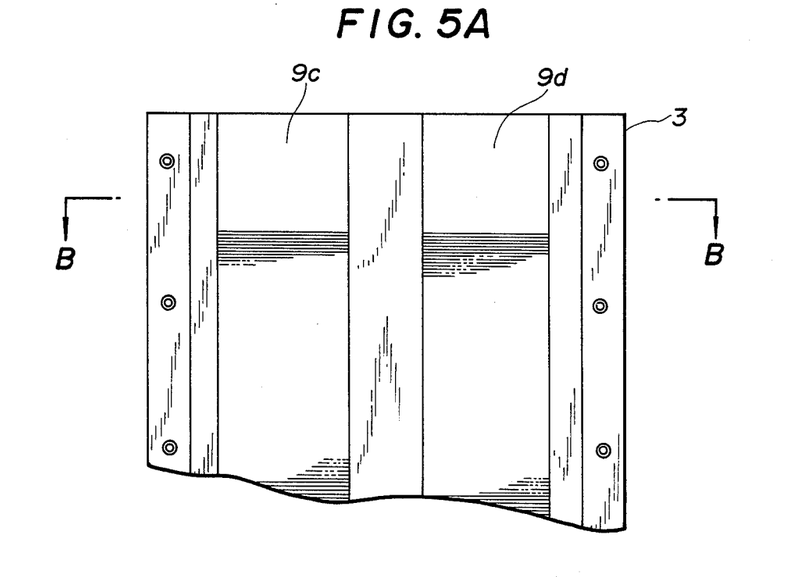
FIG. 5A is a fragmentary enlarged bottom view of the table body of the apparatus shown in FIG. 1.
Figure 5B:
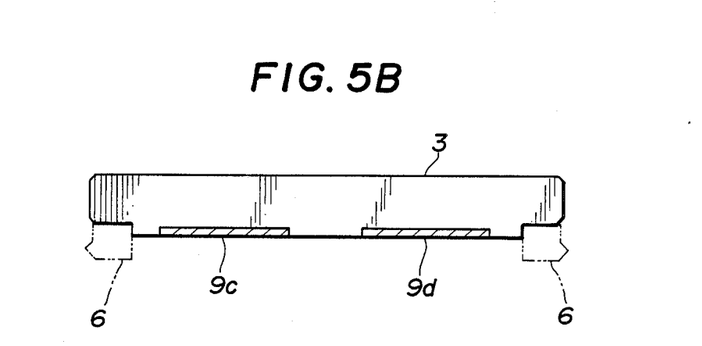
FIG. 5B is a section taken along the line B—B of FIG. 5A.

Each of the linear bearings 5, as shown in FIG. 3A to 3C, comprises a bearing block 5c having two ball-rolling grooves 5a provided on one side thereof and two ball-recirculating holes 5b formed therein, a retainer 5d which retains two trains of loaded balls, and end plates 5e each providing communication between the ball-rolling grooves 5a and the corresponding ball-recirculating holes 5b so that balls 5f circulate through the ball-rolling grooves 5a and the corresponding ball-recirculating holes 5b. The angle of contact α between each ball-rolling groove 5a and the loaded balls 5f is set at about 45 degrees in this embodiment, but the angle α is not necessarily limited to about 45 degrees, and may be set within the range of 30 to 60 degrees. The clearance between the track rails 4,4 and each of its associated linear bearings 5 interposed between the base 1 and the intermediate saddle 2, and the clearance between the track rails 6,6 and each of its associated bearings 5 interposed between the saddle 2 and the table body 3 are adjusted by means of clearance-adjusting bolts 7. More specifically, tightening the bolts 7 presses the corresponding bearings 5 at one side toward the corresponding track rails 4,6. At the same time, a counterforce to the pressure force applied by the clearance-adjusting bolts 7 acts on the linear bearings 5 on the opposite side through the intermediate saddle 2 so as to press these bearings 5 toward the associated track rails 4,6 thereby preloading the balls 5f.

Linear motors are interposed between the intermediate saddle 2 and the base 1 and between the saddle 2 and the table body 3, respectively. In this embodiment, each of the linear motors is a linear pulse motor which is constituted by a combination of movable members 8 and a fixed member 9. The linear motor is actuated by inputting pulses to the movable members 8 from a pulse generator (not shown).

More specifically, first and second fixed members 9a and 9b, each constituted by a flat plate-like magnetic member, are disposed on the base 1 so as to extend in the X-axis direction parallel to the track rails 4. On the other hand, two pairs of movable members 8 are mounted on the lower surface of the intermediate saddle 2 in such a manner as to face the first and second fixed members 9a and 9b, respectively. Each movable member 8 is constituted by a permanent magnet 8a and two magnetic cores facing each other across the magnet 8a. One of the magnetic cores is formed so as to have first and second magnetic poles 8b and 8c magnetized to N polarity by the magnet 8a, while the other core is formed so as to have third and fourth magnetic poles 8d and 8e magnetized to S polarity by the magnet 8a.

Figure 6A:
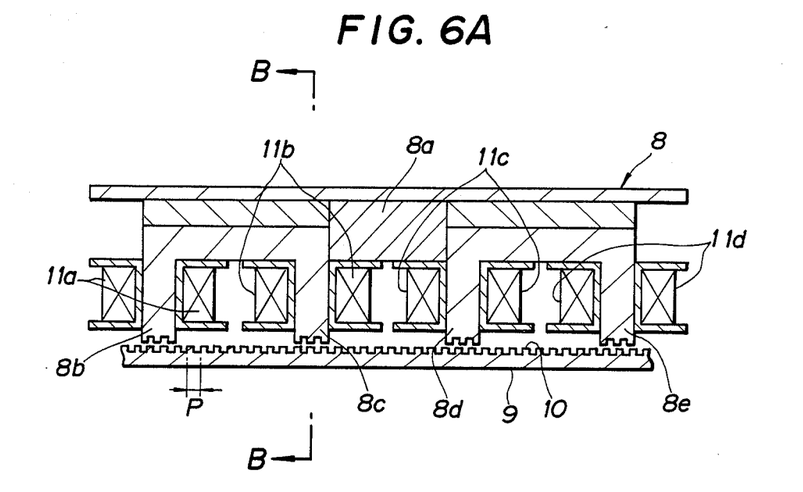
FIG. 6A is an enlarged section through the movable and fixed members of one linear pulse motor employed in the apparatus shown in FIG. 1.
Figure 6B:
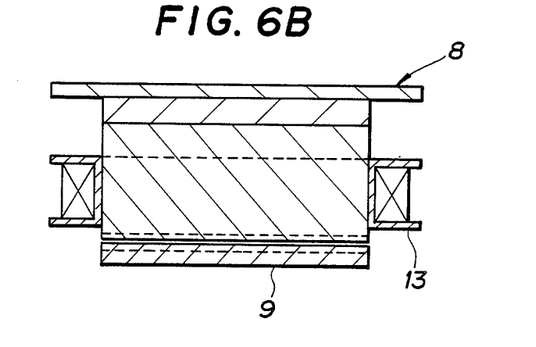
FIG. 6B is a section taken along the line B—B of FIG. 6A.

Each of the first and second fixed members 9a and 9b is, as shown in FIG. 6, provided with teeth 10 of a rectangular cross-section which extend in the Y-axis direction, the teeth 10 being spaced from each other at a constant pitch P over substantially the whole length of each fixed member. Each of the magnetic poles 8b, 8c, 8d, and 8e is also formed so as to have pole teeth at the same pitch as that of the first and second fixed members 9a and 9b.

First and second coils 11a and 11b are respectively wound around the first and second magnetic poles 8b and 8c on the N-pole side and are connected in series so that when current flows through the coils 11a and 11b, magnetic fluxes extending in opposite directions are produced. The first and second coils 11a and 11b are electrically connected to a pulse generator (not shown). Similarly, third and fourth coils 11c and 11d connected in series are respectively wound around the third and fourth magnetic poles 8d and 8e on the S-pole side, and are connected to the pulse generator.

The following description is made under the assumption that the pole teeth of the second magnetic pole 8c are a ½ pitch out of phase from those of the first magnetic pole 8b, and the pole teeth of the fourth magnetic pole 8e are also a ½ pitch out of phase from those of the third magnetic pole 8d. In addition, the pole teeth of the third and fourth magnetic poles 8d and 8e on the S-pole side are a ¼ pitch out of phase from those of the first and second magnetic poles 8b and 8c on the N-pole side, respectively, and the first and second fixed members 9a and 9b are an ⅛ pitch out of phase from each other.

The operational principle of the linear pulse motors in accordance with this embodiment will be described first.

Figure 7A:
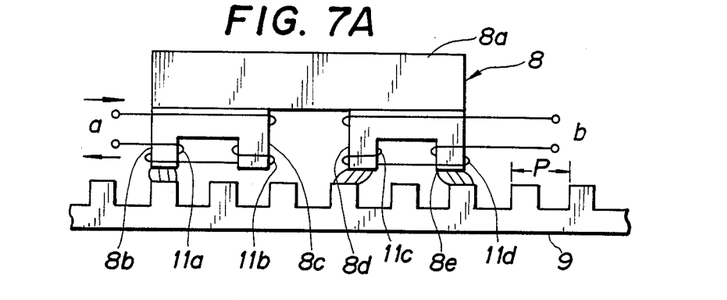
FIGS. 7A to 7D are schematic front elevations of a linear pulse motor, illustrating the operational principle of the linear pulse motor employed in the embodiment of the present invention.
Figure 7B:
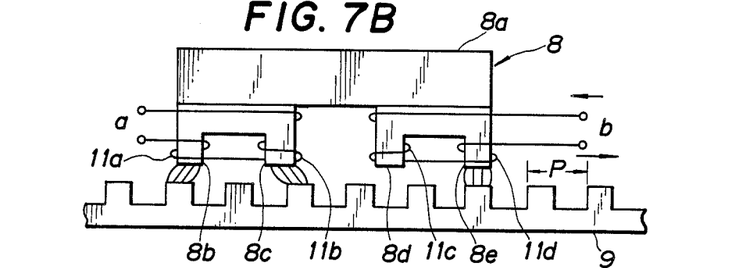
Figure 7C:
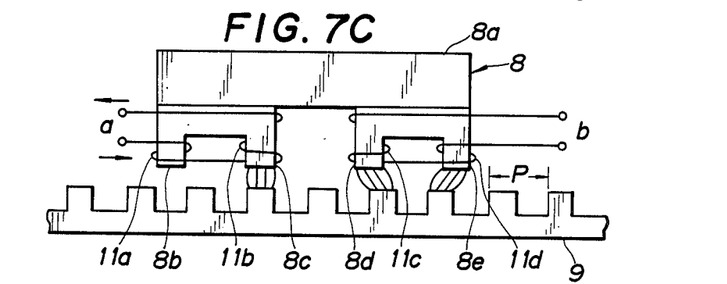
Figure 7D:
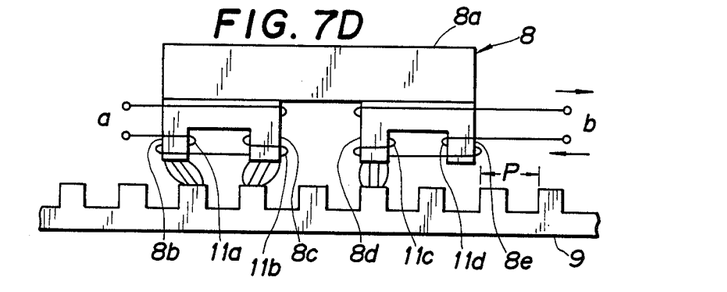

Referring to FIGS. 7A to 7D, which schematically show the operational principle of one of the linear pulse motors, pulses are input to the first and second coils 11a and 11b through terminals a, while pulses are input to the third and fourth coils 11c and 11d through terminals b. FIG. 7A shows the state wherein pulses are input to the terminals a in a direction such that the first magnetic pole 8b is excited (Mode (1)); FIG. 7B shows the state wherein pulses are input to the terminals b in a direction such that the fourth magnetic pole 8e is excited (Mode (2)); FIG. 7C shows the state wherein pulses are input to the terminals a in a direction such that the second magnetic pole 8c is excited (Mode (3)); and FIG. 7D shows the state wherein pulses are input to the terminals b in a direction such that the third magnetic pole 8d is excited (Mode (4)).

Table 1 shows the magnetic force generation conditions of each magnetic pole in Modes (1) to (4).

TABLE 1

| Mode | Magnetic force generation conditions | | Stable position |
|---|---|---|---|
| (1) | First pole: | flux from magnet 8a + flux from coil 11a | First pole |
| | Second pole: | flux from magnet 8a − flux from coil 11b = 0 | |
| | Third and | magnetic forces balanced | |

TABLE 1-continued

| Mode | Magnetic force generation conditions | | Stable position |
|---|---|---|---|
| (2) | Fourth poles: | by magnet 8a | Fourth pole |
| | First and second poles: | magnetic forces balanced by magnet 8a | |
| | Third pole: | flux from magnet 8a − flux from coil 11c = 0 | |
| | Fourth pole: | flux from magnet 8a + flux from coil 11d | |
| (3) | First pole: | flux from magnet 8a − flux from coil 11a = 0 | Second pole |
| | Second pole: | flux from magnet 8a + flux from coil 11b | |
| | Third and Fourth poles: | magnetic forces balanced by magnet 8a | |
| (4) | First and second poles: | magnetic forces balanced by magnet 8a | Third pole |
| | Third pole: | flux from magnet 8a + flux from coil 11c | |
| | Fourth pole: | flux from magnet 8a − flux from coil 11d = 0 | |

As is clear from Table 1, in Mode (1), the first magnetic pole 8b on the N-pole side has the strongest magnetic force, so that the movable member 8 is held in a stable state by the attraction force acting between the first magnetic pole 8b and the corresponding tooth of the fixed member 9. On the other hand, the third and fourth magnetic poles 8d and 8e on the S-pole side are each a ¼ pitch out of phase from the corresponding teeth of the fixed member 9. In Mode (2), the magnetic force of the first magnetic pole 8b produced by the coil 11a disappears, and the magnetic force of the fourth magnetic pole 8e on the S-pole side becomes the strongest instead, so that the movable member 8 moves in the direction in which the fourth magnetic pole 8e comes into phase with the corresponding tooth of the fixed member 9, thereby advancing the movable member 8 by a ¼ pitch. At this time, the first and second magnetic poles 8b and 8c on the N-pole side are each a ¼ pitch out of phase from the corresponding teeth of the fixed member 9.

In Mode (3), the second magnetic pole 8c on the N-pole side has the strongest magnetic force, so that the movable member 8 advances by a ¼ pitch in the direction in which the second magnetic pole 8c comes into phase with the corresponding tooth of the fixed member 9. At this time, the third and fourth magnetic poles 8d and 8e on the S-pole side are each a ¼ pitch out of phase from the corresponding teeth of the fixed member 9. In Mode (4), the third magnetic pole 8d on the S-pole side has the strongest magnetic force, so that the movable member 8 advances by a ¼ pitch in the direction in which the third magnetic pole 8d comes into phase with the corresponding tooth of the fixed member 9. Thereafter, the operation mode returns to Mode (1) in which the first magnetic pole 8b on the N-pole side has the strongest magnetic force, so that the movable member 8 advances by a ¼ pitch to reach the position shown in FIG. 7A. In this way, the movable member 8 is moved a ¼ pitch per pulse by the sequential repetition of Modes (1) to (4).

In this embodiment, each motor is constituted by a combination of one fixed member 9 and two movable members 8. However, the operational principle of this motor is similar to that of the motor described above, which is constituted by a combination of one fixed member and one movable member. Therefore, the motor in accordance with this embodiment moves by a ¼ pitch per pulse. The employment of two movable members for one fixed member doubles the propulsion force.

Linear pulse motors are also provided between the intermediate saddle 2 and the table body 3 in the following manner. Third and fourth fixed members 9c and 9d are disposed on the lower side of the table body 3 so as to extend in the Y-axis direction parallel to the track rails 6, and movable members 8 are mounted on the upper side of the intermediate saddle 2. Each of the movable members 8 has first and second magnetic poles 8b and 8c magnetized by a permanent magnet 8a so as to serve as N-poles, and third and fourth magnetic poles 8d and 8e magnetized by the magnet 8a so as to serve as S-poles, similar to the movable members 8 described above. First to fourth coils 11a to 11d are respectively wound around the first to fourth magnetic poles 8b to 8e. The first to fourth coils 11a to 11d are electrically connected to the pulse generator so that the table body 3 is moved in the Y-axis direction relative to the intermediate saddle 2 by means of pulses supplied from the pulse generator.

It must be noted that the reference numeral 13 in FIG. 6B denotes a bobbin.

The following is a description of the operation of the linear motor-driven X–Y table in accordance with this embodiment.

First, to feed the table body 3 in the X-axis direction in a large-feed mode, pulses are selectively input from the pulse generator to the movable members 8 which face either the first or second fixed member 9a or 9b disposed on the base 1, thereby driving the table body 3 by a combination of the selected fixed member and the associated movable members. In this case, the energized movable members move relative to the associated fixed member by a ¼ pitch per pulse, so that the table body 3 is fed in the X-axis direction by a ¼ pitch per pulse through the intermediate saddle 2 equipped with the movable member 8.

To feed the table body 3 in the X-axis direction in fine-feed mode, pulses are alternately input to the movable members 8 facing the first fixed member 9a and those facing the second fixed member 9b. In this case, the table body 3 moves by a ¼ pitch per pulse for each of the first and second fixed members 9a and 9b. However, since the teeth of the first fixed member 9a and those of the second fixed member 9b are an ⅛ pitch out of phase from each other, the table body 3 is finely fed in the X-axis direction by an ⅛ pitch per pulse by alternately inputting pulses to the two pairs of coils of the movable members in the manner described above. Thus, it is possible to obtain a resolution half as large as that obtained when one fixed member is used.

The feed of the table body 3 in the Y-axis direction is carried out by the linear motors provided between the table body 3 and the intermediate saddle 2 in a manner similar to that of the feed in the X-axis direction. It is similarly possible to select a large-feed mode of a ¼ pitch or a fine-feed mode of an ⅛ pitch by inputting pulses to a pair of movable members 8 facing either one of the third and fourth fixed members 9c and 9d, or by alternately inputting pulses to two pairs of movable members 8 facing the two fixed members 9c and 9d, respectively.

It must be noted that the rate of feed of the table body 3 is increased by raising the frequency of the pulses and decreased by lowering the frequency. The distance by which the table body 3 is fed is adjusted by varying the number of input pulses.

Even when a load is imposed on the table body 3, no play or chatter is produced between the table body 3 and the intermediate saddle 2, or between the saddle 2 and the base 1, since the linear bearings 5 are appropriately preloaded. In addition, since the angle of contact between each ball-rolling groove 5a and the loaded balls 5f is set at about 45 degrees, it is possible for the bearings 5 to uniformly bear any load applied thereto vertically and/or horizontally, so that the clearance between the movable and fixed members of each linear motor is kept at a constant value, and the propulsion force is thereby maintained at a constant level at all times. Even when a load is imposed on the table body 3, there is no interference between the movable and fixed members. Accordingly, the clearances between the movable and fixed members can be minimized, so that it is possible to obtain a large propulsion force and a large force for stopping the movable table 3 and retaining it in a stopped state.

It must be noted that, although two parallel fixed members are employed for each linear motor in this embodiment, three or more parallel fixed members may be used. If there are three parallel fixed members, they need only be out of phase from one another by ⅓ of a ¼ pitch, that is, by a 1/12 pitch; and if there are four parallel fixed members, it is only necessary for them to be out of phase from one another by ¼ of a ¼ pitch, that is, by a 1/16 pitch. This can provide a three-fold or four-fold resolution.

Although this embodiment employs a linear pulse motor in which each movable member moves by a ¼ pitch of the teeth of the corresponding fixed member per pulse, this type of motor is not necessarily limitative, and any type of linear pulse motor may be employed, provided that each movable member of the motor employed moves by a predetermined amount per pulse. In addition, linear pulse motors are not necessarily exclusive; other types of motor may be employed, such as linear DC motors or linear synchronous motors.

The linear motor-driven X-Y table according to the present invention, which features the arrangement and operation described above, offers the following various advantages. The employment of linear bearings enables the table body to move smoothly, and the employment of linear motors eliminates the need to use ball and nut assemblies or the like, resulting in a reduction in the overall weight of the apparatus. In consequence, inertia is reduced to improve response at the start and stop of the feed of the table body, and hence increase the degree of accuracy in positioning the same.

Since the present invention is free from problems such as twisting of ball screw shafts and backlash between each ball screw shaft and its ball nut, which are experienced in the prior art, the positioning accuracy is further improved.

Since there is no need to provide space for rotary motors or the like, it is possible to obtain an X-Y table which is slim and compact, and thus has improved general-purpose properties.

Moreover, since the number of parts required can be reduced, it is possible to reduce the production costs and increase the degree of accuracy in the assembly of the apparatus. In addition, the simplification of the structure of the apparatus makes it possible to prevent the occurrence of failures.

By alternately inputting pulses to movable members facing corresponding fixed members, it is possible to feed the table body by an amount per pulse which is smaller than that obtained by employing a single fixed member. Accordingly, the table body can be selectively fed in fine-feed mode or large-feed mode as required; and it is possible to position the table body with an extremely high accuracy.

If the angle of contact between the loaded balls and each ball-rolling groove of each of the linear bearings is set at about 45 degrees, any load applied to the bearings vertically or horizontally can be born substantially uniformly. Also, the clearance between the movable and fixed members of each linear motor can be thus maintained at a constant and limited value irrespective of loads applied to the table body in any direction so that the magnetic forces between the movable and fixed members, being in inverse proportion to the square of the distance between the movable and fixed members, may increase greatly. It is therefore possible for the linear motor to provide an increased propulsion force and force for stopping the table body and retaining the same in a stopped state, which further increases the degree of accuracy in the positioning of the table body.

Although the present invention has been described in specific terms, it must be noted here that the described embodiment is not exclusive, and various changes and modifications may be imparted thereto without departing from the scope of the invention which is limited solely by the appended claims.

What is claimed is:

1. A linear motor-driven X-Y table comprising:
    a base;
    an intermediate saddle mounted on the base so as to be linearly reciprocatable in an X-axis direction;
    a table body mounted on said intermediate saddle so as to be movable in a Y-axis direction perpendicular to said X-axis direction;
    a first linear bearing means interposed between the base and the intermediate saddle comprising a bearing block mounted on either the base or the intermediate saddle and having at least one ball-rolling groove in one side thereof, a track rail mounted on the other of said base or the said intermediate saddle and having in one side thereof at least one ball-rolling groove facing the ball-rolling groove of the bearing block, and balls interposed between the opposed ball-rolling grooves of the bearing block and said track rail, the angle of contact between the balls and each ball-rolling grooves being set at substantially 45 degrees;
    a second linear bearing means interposed between the intermediate saddle and the table body comprising a bearing block mounted on either the intermediate saddle or the table body and having at least one ball-rolling groove in one side thereof, a track rail mounted on the other of said intermediate saddle or said table body and having in one side thereof at least one ball-rolling groove facing the ball-rolling groove of the bearing block, an balls interposed between the opposed ball-rolling grooves of the bearing block and the track rail, the angle of contact between the balls and each of the ball-rolling grooves being set at about 45 degrees;
    clearance adjusting means for adjusting the clearance between each track rail and its associated bearing block;

a first linear motor provided between said intermediate saddle and said base for driving said saddle linearly relative to said base; and a second linear motor provided between said table body and said intermediate saddle for driving said table body linearly relative to said saddle.

2. A linear motor-driven X-Y table according to claim 1, wherein said first linear motor comprises fixed and movable means, said fixed means being mounted on either the upper surface of said base or the lower surface of said intermediate saddle, and said movable means being mounted on the other of said surfaces so as to face said fixed means.

3. A linear motor-driven X-Y table according to claim 2, wherein said fixed means of said first linear motor comprises a plurality of fixed members disposed parallel to each other in such a manner that teeth of each of the fixed members are out of phase with teeth of adjacent fixed members, and the movable means of said first linear motor comprises a plurality of movable members disposed parallel to each other so as to face said plurality of fixed members, respectively.

4. A linear motor-driven X-Y table according to claim 1, wherein said second linear motor comprises fixed and movable means, said fixed means being mounted on either the upper surface of said intermediate saddle or the lower surface of said table body, and said movable means being mounted on the other of said surfaces so as to face said fixed means.

5. A linear motor-driven X-Y table according to claim 4, wherein said fixed means of said second linear motor comprises a plurality of fixed members disposed parallel to each other in such a manner that teeth of each of said fixed members are out of phase with teeth of adjacent fixed members, and said movable means of said second linear motor comprises a plurality of movable members disposed parallel to each other so as to face said plurality of fixed members, respectively.

6. A linear motor-driven table comprising:

a base;

an intermediate saddle mounted on said base so as to be linearly reciprocatable in an X-axis direction; a table body mounted on said intermediate saddle so as to be movable in a Y-axis direction perpendicular to said X-axis direction;

a first linear bearing means interposed between said base and said intermediate saddle comprising a bearing block mounted on either said base or said intermediate saddle and having at least one loaded ball-rolling groove in one side thereof, a track rail mounted on the other of said base or said intermediate saddle and having in one side thereof at least one loaded ball-rolling groove facing said loaded ball-rolling groove of said bearing block to form a loaded ball-rolling passage, balls interposed between the opposed loaded ball-rolling grooves, a retainer for retaining a train of the loaded balls, and an end plate providing communication between the loaded ball-rolling passage and corresponding ball re-circulating holes formed in said bearing block, the angle of contact between said balls and each of said loaded ball-rolling grooves being at substantially 45 degrees with respect to a horizontal plane;

second linear bearing means interposed between said intermediate saddle and said table body comprising a bearing block mounted on either said intermediate saddle or said table body and having at least one loaded ball-rolling groove in one side thereof, a track rail mounted on the other of said intermediate saddle or said table body and having in one side thereof at least one loaded ball-rolling groove facing said loaded ball-rolling groove of said bearing block to form a loaded ball-rolling passage, balls interposed between said opposed loaded ball-rolling grooves, a retainer for retaining a train of the loaded balls, and an end plate providing communication between the loaded ball-rolling passage and corresponding ball re-circulating holes formed in said bearing block, the angle of contact between said balls and each of said loaded ball-rolling grooves being set at substantially 45 degrees with respect to a horizontal plane;

a first linear motor provided between said intermediate saddle and said base for driving said saddle linearly relative to said base; and a second linear motor provided between said table body and said intermediate saddle for driving said table body linearly relative to said saddle.

7. The linear motor-driven table apparatus of claim 1, wherein the clearance adjusting means comprises a plurality of bolts threaded laterally through the table body such that the end of each bolt contacts linear bearing means pressing the linear bearing means against the intermediate carriage, causing the clearance between the bearing means to be increased or decreased according to the tightening of the screw, and such adjusting means further causing a similar change in the clearance between the opposite surface of the intermediate carriage and the adjacent linear bearing means due to the reactional force of the bolts being transmitted through the table body.

* * * * *